US008559745B2

(12) United States Patent
Peng et al.

(10) Patent No.: US 8,559,745 B2
(45) Date of Patent: Oct. 15, 2013

(54) IMAGE SIGNAL PROCESSOR AND METHOD FOR IMAGE ENHANCEMENT

(75) Inventors: Yuan-Chih Peng, Tainan (TW); Po-Chang Chen, Tainan (TW); Jing-Chu Chan, Tainan (TW)

(73) Assignee: Himax Imaging Limited, Tainan (TW)

( * ) Notice: Subject to any disclaimer, the term of this patent is extended or adjusted under 35 U.S.C. 154(b) by 138 days.

(21) Appl. No.: 13/240,896

(22) Filed: Sep. 22, 2011

(65) Prior Publication Data

US 2013/0077860 A1 Mar. 28, 2013

(51) Int. Cl.
*G06K 9/40* (2006.01)
*G06K 9/34* (2006.01)

(52) U.S. Cl.
USPC .......... 382/263; 382/269

(58) Field of Classification Search
USPC .......... 382/162, 164, 167, 254, 260–264; 348/625, 630, 631, 647, 687, 712, 348/E05.119, E09.053; 375/240.04, 375/240.16, 263; 345/544
See application file for complete search history.

(56) References Cited

U.S. PATENT DOCUMENTS

| | | | | |
|---|---|---|---|---|
| 6,313,883 | B1 * | 11/2001 | Thaler | 348/630 |
| 6,873,657 | B2 * | 3/2005 | Yang et al. | 375/240.16 |
| 7,420,623 | B2 * | 9/2008 | Nakakuki | 348/625 |
| 7,949,199 | B2 * | 5/2011 | Lin | 382/263 |
| 2008/0316221 | A1 * | 12/2008 | Aas | 345/544 |
| 2011/0037901 | A1 * | 2/2011 | Ueyama | 348/647 |

* cited by examiner

*Primary Examiner* — Amir Alavi
(74) *Attorney, Agent, or Firm* — McClure, Qualey & Rodack, LLP

(57) ABSTRACT

An image signal processor for image enhancement is provided. The image signal processor receives a first, a second, and a third component of an RGB signal of each pixel of an image, and has: an image enhancer for performing image enhancement on the first component of the RGB signal to produce a first enhanced component of the RGB signal; a gain generator, coupled to the image enhancer, for producing an enhancement gain based on the first component and the first enhanced component of the RGB signal; and a gain multiplier, coupled to the gain generator, for performing image enhancement on the second and the third component based on the enhancement gain to produce a second and a third enhanced component.

14 Claims, 5 Drawing Sheets

IMAGE SIGNAL PROCESSOR AND METHOD FOR IMAGE ENHANCEMENT

BACKGROUND OF THE INVENTION

1. Field of the Invention

The present invention relates to image signal processing techniques, and in particular relates to image signal processing techniques for image enhancement.

2. Description of the Related Art

A Bayer filter, commonly used in a digital camera or a camcorder, is a color filter array (CFA) for arranging RGB color filters on a square grid of an image sensor. FIG. 1 shows an arrangement pattern of the Bayer filter. Since human eyes are most sensitive to green light, the Bayer filter uses twice as many green elements as red or blue in the image sensors. As can be seen from FIG. 1A, the arrangement pattern of the Bayer filter is 50% green, 25% red and 25% blue.

FIG. 2 illustrates the processes of the image signal processing (ISP) technique in the prior art. After the color sensing procedure (step S202) is performed on the image sensor, the demosaicking procedure (step S204) proceeds to use a form of interpolation to reconstruct a full color image from the color data (in raw format) obtained by the image sensor. In the full color image, each of the pixels has an RGB signal including a red (R), a green (G), and a blue (B) component. In the prior art, in order to perform image enhancement such as noise reduction or sharpness enhancement (step S208), the RGB signals of the pixels have to be converted, by the so-called color space conversion (CSC) procedure (step S206), to luminance and chrominance signals (i.e., YCbCr signals) since, in the prior art, luminance is regarded as being more important in the procedures of reducing noise or enhancing sharpness of an image than color (thus, the image enhancement procedure in the prior art is usually performed only with the luminance signal rather than the chrominance signal). At last, after image enhancement (step S208), the enhanced luminance and chrominance signals will be further converted back to the RGB signals (step S210).

Based on the same reason for using the Bayer filter (that is, human eyes is most sensitive to green light), the green sensor (sensor covered by green color filter) is usually designed to have better and higher signal to noise ratio (SNR) than the other two color sensors, which are the red and blue sensors. As a result, the prior art using the luminance signal, which is converted from the RGB signal and much more influenced by the green color signal than the other two color signals (for example, according to ITU 601 standard, the relationship between the luminance signal Y and the RGB signal is: $Y=16+0.299\times R+0.587\times G+0.114\times B$), for image enhancement, may introduce more noise from the luminance signal and finally produce a processed image with more noise after image enhancement. Moreover, doing sharpness enhancement on luminance only may make false color phenomenon caused by the demosaicking procedure become even worse.

Therefore, it is desirable to provide a new image signal processor or method which can overcome the above issues.

BRIEF SUMMARY OF THE INVENTION

The present invention provides an image signal processor for image enhancement, receiving a first, a second, and a third component of an RGB signal of each pixel of an image, comprising: an image enhancer for performing image enhancement on the first component of the RGB signal to produce a first enhanced component of the RGB signal; a gain generator, coupled to the image enhancer, for producing an enhancement gain based on the first component and the first enhanced component of the RGB signal; and a gain multiplier, coupled to the gain generator, for performing image enhancement on the second and the third component based on the enhancement gain to produce a second and a third enhanced component.

The present invention also provides an image signal processing method for image enhancement, comprising the steps of: receiving a first, a second, and a third component of an RGB signal of each pixel of an image; performing image enhancement on the first component of the RGB signal to produce a first enhanced component of the RGB signal; producing an enhancement gain based on the first component and the first enhanced component of the RGB signal; and performing image enhancement on the second and the third component based on the enhancement gain to produce a second and a third enhanced component.

A detailed description is given in the following embodiments with reference to the accompanying drawings.

BRIEF DESCRIPTION OF THE DRAWINGS

The present invention can be more fully understood by reading the subsequent detailed description and examples with references made to the accompanying drawings, wherein.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims. For simplicity, in the discussion that follows, an image signal processor or an image signal processing method which processes an RGB signal is used as an exemplary embodiment. It should be understood, however, that the apparatus and method of the present invention may be applied to other color signal, such as CYMK signal. Specifically, when the color signal is the RBG signal, the first, the second, and the third component of the color signal is respectively selected from a red, a green, and a blue component of the RGB signal; and when the color signal is a CYMK signal, the first, the second, and the third component of the color signal is respectively selected from a cyan, a yellow, a magenta, and a black component of the CMYK signal.

Image Signal Processor

Embodiment 1

Figure 1:
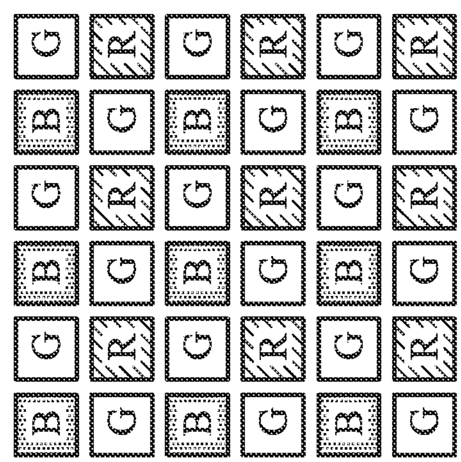
FIG. 1 shows an arrangement pattern of the Bayer filter.
Figure 2:
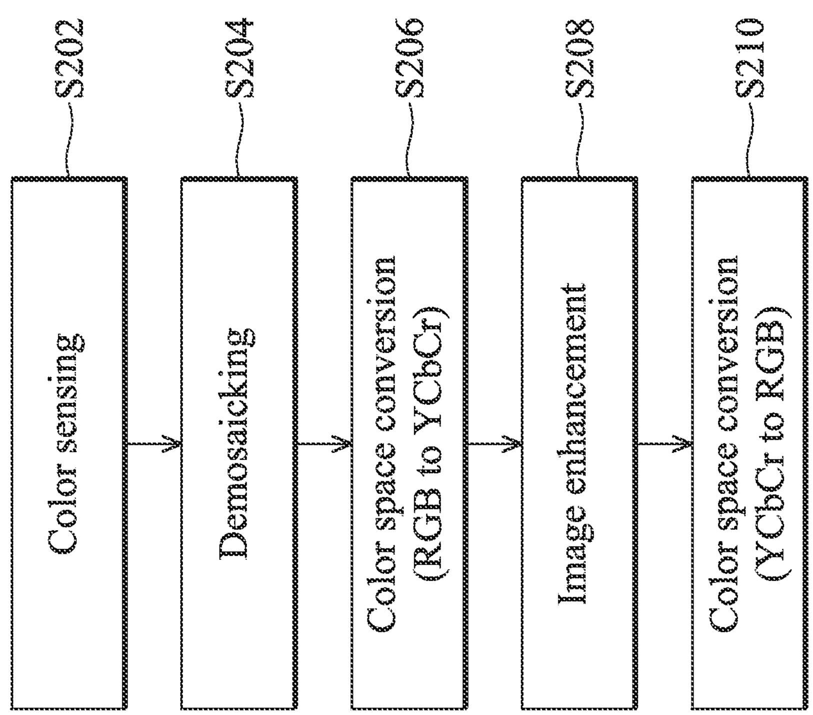
FIG. 2 illustrates the processes of the image signal processing (ISP) technique in the prior art.
Figure 3A:
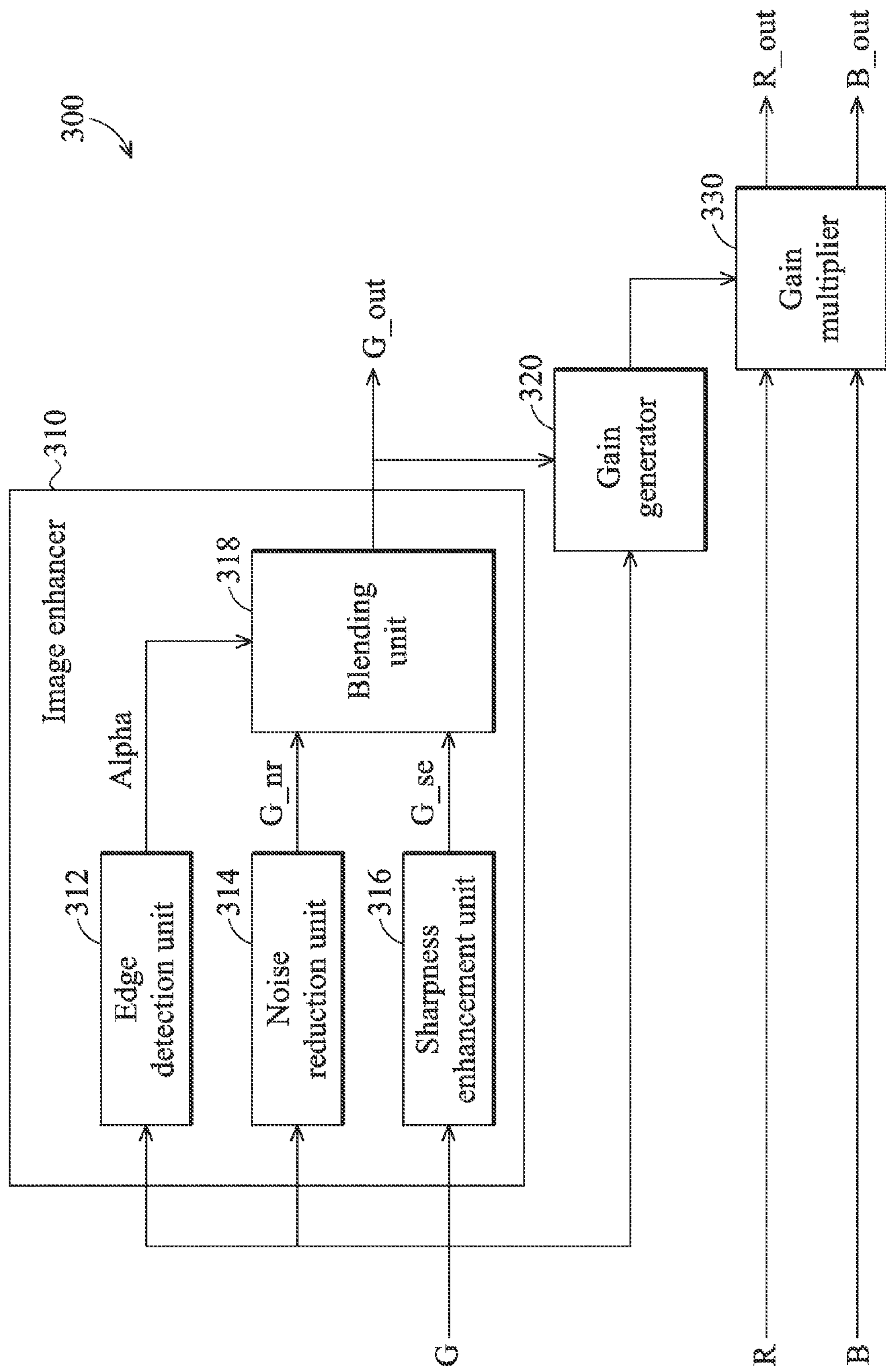
FIG. 3A is a schematic diagram of an image signal processor for performing image enhancement according to an embodiment of the present invention.

FIG. 3A is a schematic diagram of an image signal processor for performing image enhancement according to an embodiment of the present invention. The image signal processor 300 receives an RGB signal of each pixel of an image, for example, from a demosaicking procedure, which includes red (R), green (G) and blue (B) components, and directly performs image enhancement on the RGB signal without the color space conversion (CSC) which turns the RGB signal into the luminance and chrominance signal. The image signal processor 300 at least comprises an image enhancer 310, a gain generator 320, and a gain multiplier 330, where the image enhancer 310 receives one component, and the gain multiplier 330 receives the other two components of the RGB signal.

The image enhancer 310 is used for performing image enhancement, such as noise reduction or sharpness enhancement, on one component of the RGB signal. In a preferred embodiment, the image enhancer 310 performs image enhancement on the green component G of the RGB signal because the green component is usually created with a higher sampling rate and higher SNR. Note that this example which is shown in FIG. 3 and will be discussed later is intended for illustration only, and the present invention should not be limited thereto. In other embodiments, the image enhancer 310 may focus on processing the red component R or blue component B instead. In this embodiment, after the image enhancement for the green component G, the image enhancer 310 produces an enhanced green component G_out.

The gain generator 320 is coupled to the image enhancer 310, and, in this embodiment, is used for producing an enhancement gain based on the green component G and the enhanced green component G_out of the RGB signal. For example, the gain generator 320 produces the enhancement gain by dividing the enhanced green component G by the green component G_out. Thus, the enhancement gain $I_{gain}$ is the ratio of the enhanced green component G_out to the green component $$G\left(I_{gain} = \frac{\text{G\_out}}{G}\right).$$

The gain multiplier 330 is coupled to the gain generator 320, and is used for performing image enhancement on the red component R and the blue component B based on the enhancement gain produced by the gain generator 320 to produce an enhanced red component R_out and an enhanced blue component B_out. For example, the gain generator 320 produces the enhanced red component R_out and the enhanced blue component B_out through multiplying the red component R and the blue component B by the enhancement gain (R_out=$I_{gain}$×R; and B_out=$I_{gain}$×B).

As shown in FIG. 3A, the image enhancer 310 of this embodiment comprises an edge detection unit 312, a noise reduction unit 314, a sharpness enhancement unit 316, and a blending unit 318.

The noise reduction unit 314 is used to reduce the noise from the image. Specifically, in an embodiment, the noise reduction unit 314 may reduce the noise by convolving an original image with a mask that represents a low-pass filter. In this manner, the value of the green component of one pixel will be recalculated with that of the other pixels surrounding it by the noise reduction unit 314. For example, given a green component array G, and a filter mask F_nr for noise reduction as follows:

$$G = \begin{bmatrix} G_6 & G_7 & G_8 \\ G_{11} & G_{12} & G_{13} \\ G_{16} & G_{17} & G_{18} \end{bmatrix}; \text{and F\_nr} = \begin{bmatrix} 1/16 & 2/16 & 1/16 \\ 2/16 & 4/16 & 2/16 \\ 1/16 & 2/16 & 1/16 \end{bmatrix},$$

for the pixel having the original green component $G_{12}$, the noise-reduced green component G_nr may be recalculated as follows:

$$G\_nr = a \times [(G_6+G_8+G_{16}+G_{18})+2\times(G_7+G_{11}+G_{13}+G_{17})+4\times G_{12}]/16+(1-a)\times G_{12},$$

wherein a is a coefficient with which the image signal processor may use to further adjust the noise-reduced green component G_nr.

The sharpness enhancement unit 316 is used to enhance the sharpness of the image. Similarly with the noise reduction unit 314, the sharpness enhancement unit 316, in an embodiment, may enhance the sharpness by convolving the original image with another filter mask. In this manner, the value of the green component of one pixel will be recalculated with that of the other pixels surrounding it by the sharpness enhancement unit 316. For example, given the same green component array G, and a filter mask F_se for sharpness enhancement as follows:

$$G = \begin{bmatrix} G_6 & G_7 & G_8 \\ G_{11} & G_{12} & G_{13} \\ G_{16} & G_{17} & G_{18} \end{bmatrix}; \text{and F\_se} = \begin{bmatrix} -1 & -1 & -1 \\ -1 & 8 & -1 \\ -1 & -1 & -1 \end{bmatrix},$$

for the pixel having the original green component $G_{12}$, the sharpness-enhanced green component G_se may be recalculated as follows:

$$G\_se = b \times [8\times G_{12}-(G_6+G_7+G_8+G_{11}+G_{13}+G_{16}+G_{17}+G_{18})]+G_{12},$$

wherein b is a coefficient with which the image signal processor may use to further adjust the sharpness-enhanced green component G_se.

The edge detection unit 312 is used to detect edges in the image; specifically, to identify points in the image at which the image brightness or color has discontinuities. In image signal processing, removing noise usually accompanies sacrificing actual detail, or decreasing sharpness of the image. For the tradeoff between noise reduction and sharpness enhancement, the edge detection unit 312 further determines the relationship between the pixel and the edges, because the closer the pixel is to the edges, the more sharpness enhancement and the less the noise reduction is required, and vice versa. Then, the blending unit 318, coupled to the noise reduction unit 314, the sharpness enhancement unit 316 and the edge detection unit 312, can use the relationship between the pixel and the edges determined by the edge detection unit 312 to blend the noise-reduced green component G_nr with the sharpness-enhanced green component G_se described above, and finally create the enhanced green component G_out. For example, given the same green component array G, and a filter mask F_ed for edge detection as follows:

$$G = \begin{bmatrix} G_6 & G_7 & G_8 \\ G_{11} & G_{12} & G_{13} \\ G_{16} & G_{17} & G_{18} \end{bmatrix}; \text{and F\_ed} = \begin{bmatrix} -1 & -1 & -1 \\ -1 & 8 & -1 \\ -1 & -1 & -1 \end{bmatrix},$$

for the pixel having the green component $G_{12}$, the relationship Ed between the pixel and the edges may be determined as follows:

$$Ed = |8\times G_{12}-(G_6+G_7+G_8+G_{11}+G_{13}+G_{16}+G_{17}+G_{18}|.$$

When given an upper limit of the proximity Ed_max, the relationship Ed between the pixel and the edges can be further turned into a ratio α as follows:

$$\text{if } Ed > Ed\_\max,\ \alpha = 1;$$

$$\text{else, } \alpha = \frac{Ed}{\text{Ed\_max}}.$$

At last, the enhanced green component G_out can be obtained as follows:

$$G\_out = \alpha \times G\_se + (1-\alpha) \times G\_nr;$$

where the tradeoff between noise reduction and sharpness enhancement is appropriately balanced.

Image Signal Processor

Embodiment 2

Figure 3B:
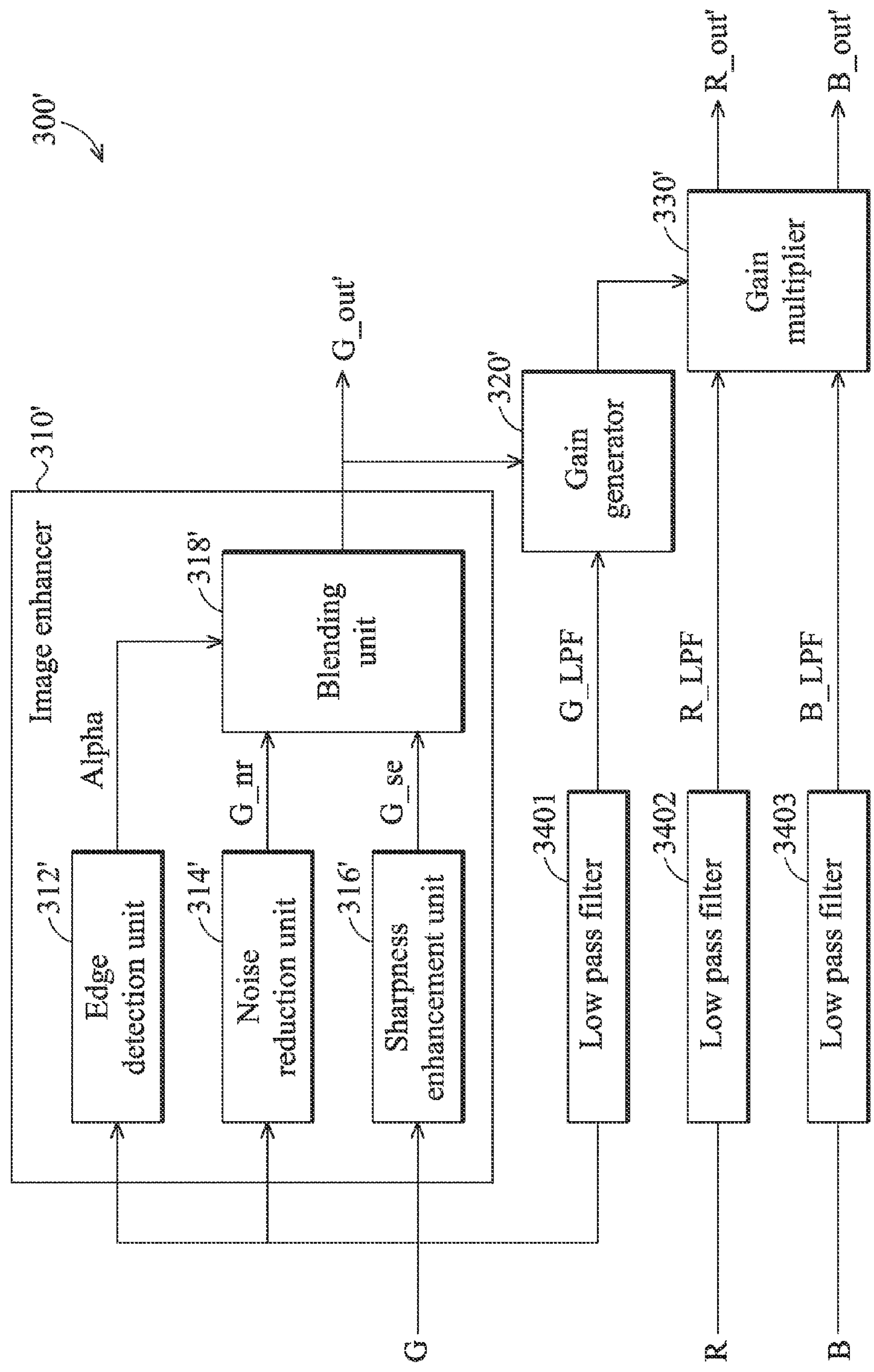
FIG. 3B is a schematic diagram of an image signal processor for performing image enhancement according to another embodiment of the present invention.

FIG. 3B is a schematic diagram of an image signal processor for performing image enhancement according to another embodiment of the present invention. Similarly, the image signal processor 300' receives an RGB signal of each pixel of an image, which includes red (R), green (G) and blue (B) components, and directly performs image enhancement on the RGB signal without the color space conversion (CSC) which turns the RGB signal into the luminance and chrominance signal. The image signal processor 300' also comprises an image enhancer 310', a gain generator 320', and a gain multiplier 330', where the image enhancer 310' receives one component, and the gain multiplier 330' receives the other two components of the RGB signal.

Similarly, the image enhancer 310' is used for performing image enhancement, such as noise reduction or sharpness enhancement, on one component of the RGB signal, for example, green component G. After the image enhancement for the green component G, the image enhancer 310' produces an enhanced green component G_out'. The gain generator 320' is coupled to the image enhancer 310', and is used for producing an enhancement gain. The gain multiplier 330', coupled to the gain generator 320', is used for performing image enhancement on the red component R and the blue component B based on the enhancement gain produced by the gain generator 320' to produce an enhanced red component R_out' and an enhanced blue component B_out'. The image enhancer 310' also comprises an edge detection unit 312', a noise reduction unit 314', a sharpness enhancement unit 316', and a blending unit 318', for reducing noise and enhancing sharpness, which operate similar to those in the embodiments previously described.

Different from the Embodiment 1, however, the image signal processor 300' in this Embodiment 2 further comprises three low pass filters 3401, 3402 and 3403, respectively for subtracting high-frequency noises from the red, green and blue components R, G and B in advance before outputting those components to the gain generator 320' or the gain multiplier 330'. The low pass filters 3401, 3402 and 3403 respectively produce a low-pass-filtered red component R_LPF, green component G_LPF, and blue component B_LPF. For example, the low-pass-filtered green component G_LPF is:

$$G\_out = (G_6 + G_7 + G_8 + G_{11} + G_{12} + G_{13} + G_{16} + G_{17} + G_{18})/9.$$

Then, the gain generator 320' produces the enhancement gain $I_{gain'}$, which is $$\left(I_{gain'} = \frac{\text{G\_out}}{\text{G\_LPF}}\right);$$

the gain generator 320' produces the enhanced red component R_out' and the enhanced blue component B_out' through multiplying the red component R and the blue component B by the enhancement gain (R_out'=$I_{gain'}$×R; and B_out'=$I_{gain'}$×B).

By using these low pass filters 3401, 3402 and 3403, the image signal output by the image signal processor can be further improved. Although three filters are described in this embodiment, those skilled in the art can appreciate that the number, the type and the arrangement of the filters is not be limited in this regard.

Method for Image Enhancement

Figure 4:
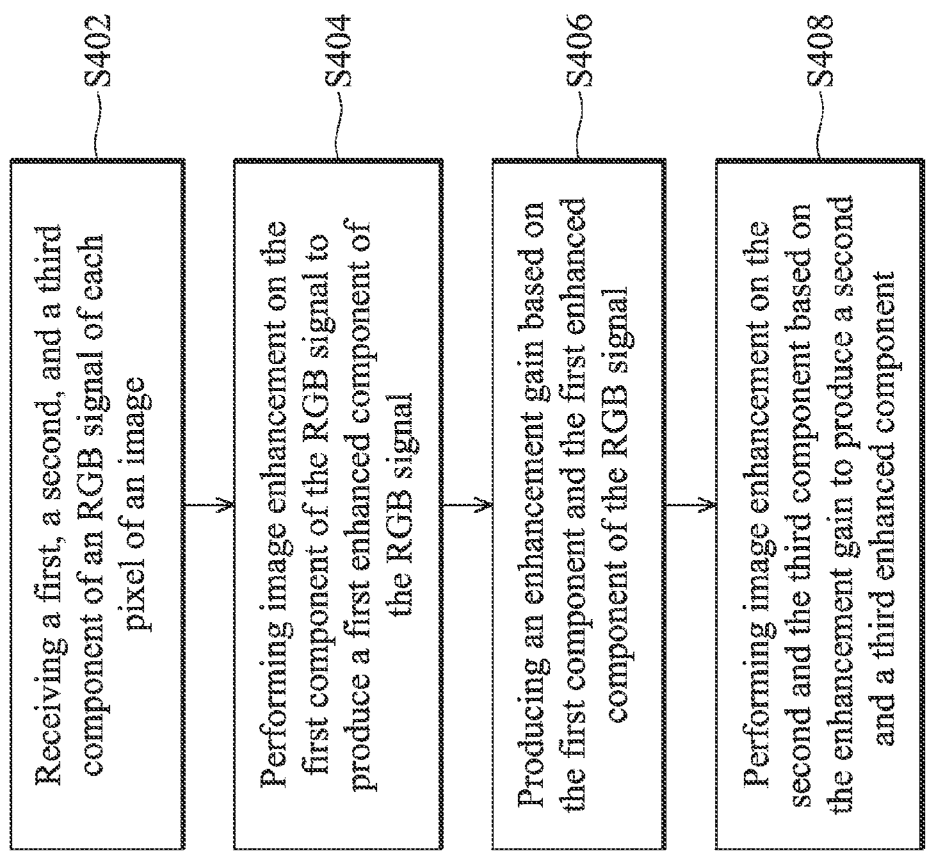
FIG. 4 is a flowchart of the image signal method according to an embodiment of the present invention.

In addition to the image signal processor 300 described above, the present invention further provides an image signal method for image enhancement. FIG. 4 is a flowchart of the image signal method according to an embodiment of the present invention. The image signal method comprises: in step S402, receiving a first, a second, and a third component of an RGB signal of each pixel of an image, wherein the first, the second, and the third component is respectively selected from a red, a green, and a blue component of the RGB signal; in step S404, performing image enhancement such as noise reduction, sharpness enhancement, and edge detection, on the first component of the RGB signal to produce a first enhanced component of the RGB signal; in step S406, producing an enhancement gain based on the first component and the first enhanced component of the RGB signal; and in step S408, performing image enhancement on the second and the third component based on the enhancement gain to produce a second and a third enhanced component. In an embodiment, the enhancement gain may be obtained by dividing the first enhanced component by the first component, and the second and the third enhanced component can be obtained by multiplying the second and the third component by the enhancement gain. The steps S402~408 are similar to those described above in respect to the units of the image signal processor as shown in FIG. 3. Therefore, detailed illustration has been omitted for simplification.

As can be seen from the above, the image signal processor and image signal processing method can adjust the noise and sharpness of an image without using the color space conversion (CSC), thus, reducing the cost of hardware implementation.

While the invention has been described by way of example and in terms of the preferred embodiments, it is to be understood that the invention is not limited to the disclosed embodiments. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. An image signal processor for image enhancement, receiving a first, a second, and a third component of a color signal of each pixel of an image, comprising:

an image enhancer for performing image enhancement on the first component of the color signal to produce a first enhanced component of the color signal;

a gain generator, coupled to the image enhancer, for producing an enhancement gain based on the first component and the first enhanced component of the color signal; and a gain multiplier, coupled to the gain generator, for performing image enhancement on the second and the third component based on the enhancement gain to produce a second and a third enhanced component, wherein the image enhancer further comprises:

a noise reduction unit for receiving the first component, performing noise reduction on the first component and producing a noise-reduced component;

a sharpness enhancement unit for receiving the first component, performing sharpness enhancement on the first component and producing a sharpness enhanced component;

an edge detection unit for detecting edges of irrelevant figures in the image and determining the relationship between the pixel and the edges;

a blending unit, coupled to the noise reduction unit, the sharpness enhancement unit, and the edge detection unit, for blending the noise-reduced component with the sharpness enhanced component to produce the first enhanced component according to the relationship determined by the edge detection unit.

2. The image signal processor as claimed in claim 1, wherein the enhancement gain is a ratio of the first enhanced component to the first component.

3. The image signal processor as claimed in claim 2, wherein the gain multiplier multiplies the second and the third component by the enhancement gain to produce the second and the third enhanced component.

4. The image signal processor as claimed in claim 1, wherein the noise reduction is performed by convoluting image with a low-pass filter.

5. The image signal processor as claimed in claim 1, wherein the color signal is an RBG signal, and the first, the second, and the third component are respectively selected from a red, a green, and a blue component of the RGB signal.

6. The image signal processor as claimed in claim 5, wherein, when the RGB signal is from a Bayer filter, the first component is a green component of the RGB signal.

7. The image signal processor as claimed in claim 1, wherein the color signal is a CYMK signal, and the first, the second, and the third component is respectively selected from a cyan, a yellow, a magenta, and a black component of the CMYK signal.

8. An image signal processing method for image enhancement, comprising the steps of:

receiving a first, a second, and a third component of an color signal of each pixel of an image;

performing image enhancement on the first component of the color signal to produce a first enhanced component of the color signal;

producing an enhancement gain based on the first component and the first enhanced component of the color signal;

performing image enhancement on the second and the third component based on the enhancement gain to produce a second and a third enhanced component, receiving the first component, performing noise reduction on the first component and producing a noise-reduced component;

receiving the first component, performing sharpness enhancement on the first component and producing a sharpness enhanced component;

detecting edges of irrelevant figures in the image and determining the relationship between the pixel and the edges; and blending the noise-reduced component with the sharpness enhanced component to produce the first enhanced component according to the relationship determined by the edge detection unit.

9. The image signal processing method as claimed in claim 8, wherein the enhancement gain is a ratio of the first enhanced component to the first component.

10. The image signal processing method as claimed in claim 9, wherein the second and the third enhanced component is produced by multiplying the second and the third component by the enhancement gain to produce the second and the third enhanced component.

11. The image signal processing method as claimed in claim 8, wherein the noise reduction is performed by convoluting image with a low-pass filter.

12. The image signal processing method as claimed in claim 8, wherein the first, the second, and the third component is respectively selected from a red, a green, and a blue component of the RGB signal.

13. The image signal processing method as claimed in claim 12, wherein, when the RGB signal is from a Bayer filter, the first component is a green component of the RGB signal.

14. The image signal processing method as claimed in claim 8, wherein the color signal is a CYMK signal, and the first, the second, and the third component is respectively selected from a cyan, a yellow, a magenta, and a black component of the CMYK signal.

* * * * *